United States Patent [19]
Maidagan

[11] Patent Number: 5,780,801
[45] Date of Patent: Jul. 14, 1998

[54] SEMI-WATERTIGHT STRUCTURE FOR SEALING PLATE OF AN IMMERSION WIRE ELECTRIC DISCHARGE MACHINE

[75] Inventor: Javier Maidagan, Vizcaya, Spain

[73] Assignee: Ona Electro-Erosion, S.A., Spain

[21] Appl. No.: 688,377

[22] Filed: Jul. 30, 1996

[30] Foreign Application Priority Data

May 6, 1996 [ES] Spain ......................... 9601191

[51] Int. Cl.⁶ .................... B23H 7/02; B23H 7/36
[52] U.S. Cl. ..................... 219/69.14; 219/69.12
[58] Field of Search ................ 219/69.11, 69.14, 219/69.12

[56] References Cited

U.S. PATENT DOCUMENTS

| | | |
|---|---|---|
| 3,179,423 | 4/1965 | McCloud . |
| 4,392,195 | 7/1983 | Inoue . |
| 4,565,915 | 1/1986 | Girardin ................ 219/69.12 |
| 4,918,279 | 4/1990 | Babel et al. ........... 219/69.12 |
| 5,028,757 | 7/1991 | Aramaki et al. ....... 219/69.12 |
| 5,111,016 | 5/1992 | Lodetti et al. ......... 219/69.12 |
| 5,171,955 | 12/1992 | Hosaka et al. ........ 219/69.12 |
| 5,196,666 | 3/1993 | Hosaka ................. 219/69.12 |

FOREIGN PATENT DOCUMENTS

| | | |
|---|---|---|
| 0621100 | 10/1994 | European Pat. Off. . |
| 0133160 | 2/1985 | France . |
| 56-137931 | 10/1981 | Japan . |
| 57-56253 | 4/1982 | Japan . |

Primary Examiner—Geoffrey S. Evans
Attorney, Agent, or Firm—Bierman, Muserlian and Lucas

[57] ABSTRACT

A semi-watertight structure is used around the elements in an electroerosion machine. The window in the rear wall of the tank is covered by a plate in which a hole has been machined. Through the hole the electrode-holder arm passes into the tank. Semi-watertight coupling is mounted around the hole and is in the electrode-holder arm. A plastic sliding plates of low coefficient of friction covers the window. Between the side wall and the plate is a plastic frame of low coefficient of friction. The frame is placed around the window and fastened to the rear wall of the tank. Bearings hold the plate against the frame. This provides a simple arrangement and avoids the stress normally associated with a completely watertight seal.

2 Claims, 2 Drawing Sheets

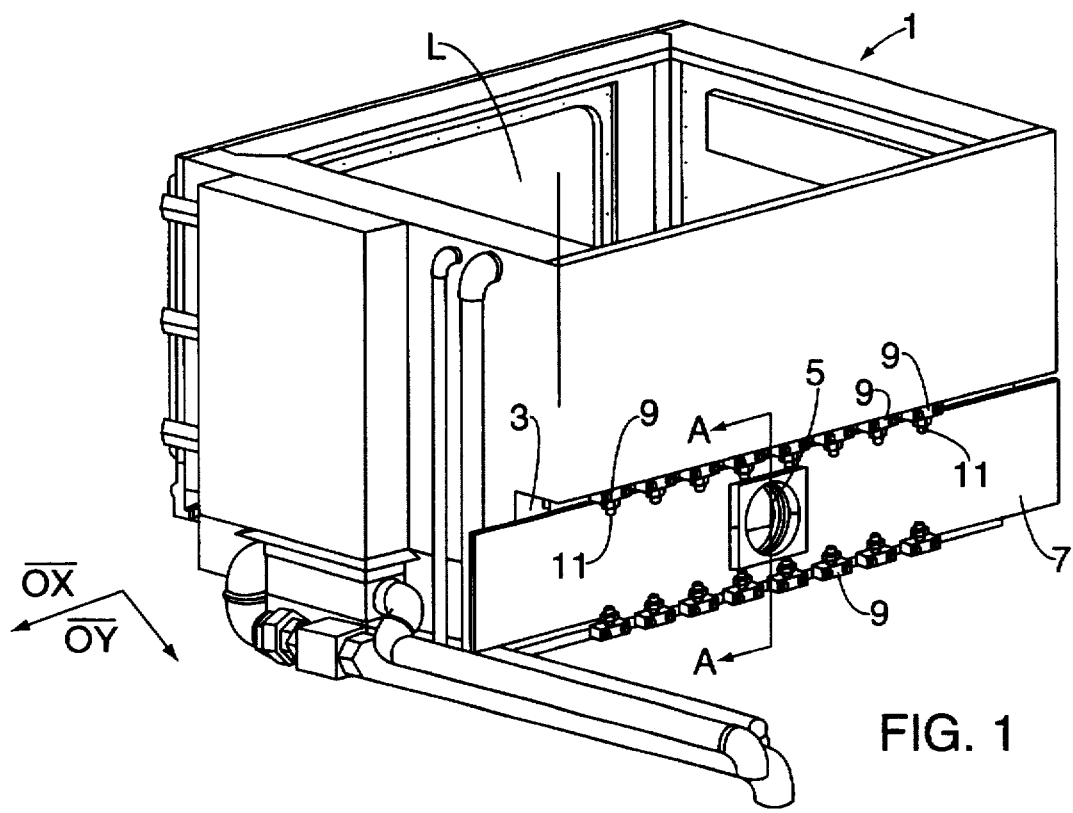
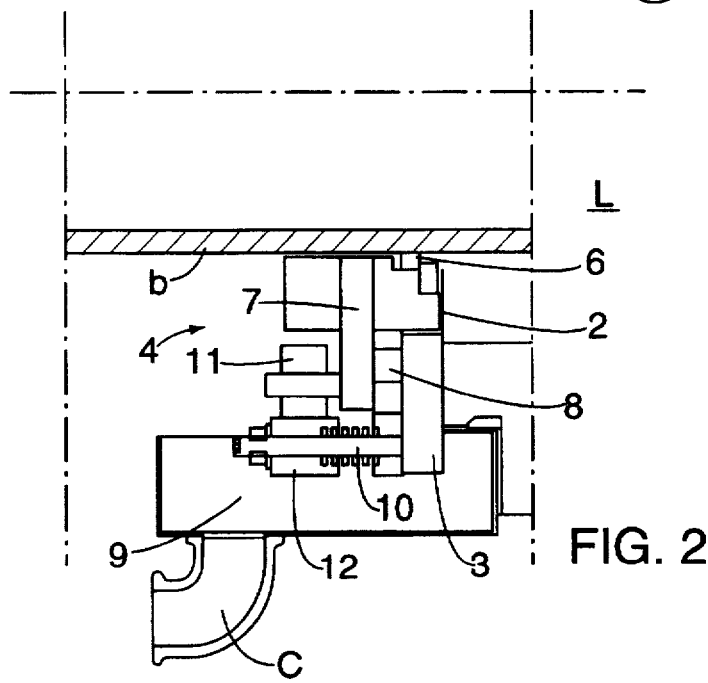

SEMI-WATERTIGHT STRUCTURE FOR SEALING PLATE OF AN IMMERSION WIRE ELECTRIC DISCHARGE MACHINE

BACKGROUND OF THE INVENTION

1. Field of Invention

This invention relates to electroerosion machines and especially immersion wire electric discharge machines (EDM).

2. Related Art

Electroerosion machines and especially immersion wire electric discharge machines use a wire which is stretched between two electrode-holder arms to cut a metal work piece. The lower arm is positioned inside a tank while the upper arm is positioned above the tank. The tank is filled with a working liquid, typically a hydrocarbon. The lower arm is arranged to pass through a side wall of the tank.

Traditionally, the lower arm which passes through the side wall of the tank is arranged in a watertight manner with respect to the side wall of the tank to prevent the liquid in the tank from escaping through the hole through which the arm enters the tank.

The hole in the side of the tank through which the arm enters the tank is usually an elongated window to allow for movement of the tank relative to the arm. The window is covered with a plate and the lower arm passes through a hole in the plate. Generally, the tank is movable while the arm stays stationary during operations.

Traditionally, it was believed that there must be a watertight arrangement for the arm where it passes through the side wall of the tank. Such a watertight arrangement was accomplished by means of elaborate arrangements which often employed large forces between the different elements to maintain the watertight arrangement. The large forces used to maintain the watertight arrangement can cause undesirable stress and unwanted displacements between the tank, which moves during operation, to the arm, which is stationary during operation.

SUMMARY OF THE INVENTION

Applicant has found that there is an incompatibility between a watertight arrangement, an absence of stress between the tank and the arm to maintain the watertight arrangement, and a simplicity of design for obtaining a watertight arrangement between the arm and the tank. Applicant has also found that the key lies in not demanding an absolute watertight arrangement.

In order to provide a simple arrangement between the arm and the tank, and avoid stress between the different elements, a semi-watertight arrangement is employed in this invention.

The semi-watertight arrangement invented by applicant employs a bearing arrangement which holds the plate that covers the windows in a semi-watertight arrangement with the side wall of the tank. Both the plate and the bearing arrangement are positioned on the outside of the tank for ease of maintenance and operation. The plate has dimensions which are larger than the window in the side of the tank to allow the plate to move relative to the side of the tank while still covering the opening of the window in the side of the tank. The bearing arrangement is affixed to the side wall of the plate in a semi-watertight arrangement with the tank. In the plate is a hole through which the electrode-holder arm passes. Preferably, the plate is made of a plastic material having a low coefficient of friction. The plate has dimensions, width and length, greater than the dimensions, width and length, of the window so that, as the tank moves, the plate always completely fills the window.

A plastic frame having a low coefficient of friction is mounted around the window and fastened to the outside of the tank side wall. The frame is positioned between the plate and the side wall of the tank.

A semi-watertight frame is employed on both sides of the plate around the hole in the plate through which the electrode-holder passes. This semi-watertight frame is coupled with the outside of the electrode-holder arm and the plate to provide a semi-watertight seal between the electrode-holder arm and the plate.

BRIEF DESCRIPTION OF THE DRAWINGS

These and other aspects of the present invention may be more readily understood by reference to the following drawings:

FIG. 1 is a perspective view of an electroerosion machine tank incorporating the present invention;

FIG. 2 is a partial view taken through section A:A of FIG. 1 with an electrode-holder arm positioned in the hole in the plate;

DETAILED DESCRIPTION OF INVENTION

Figure 3:
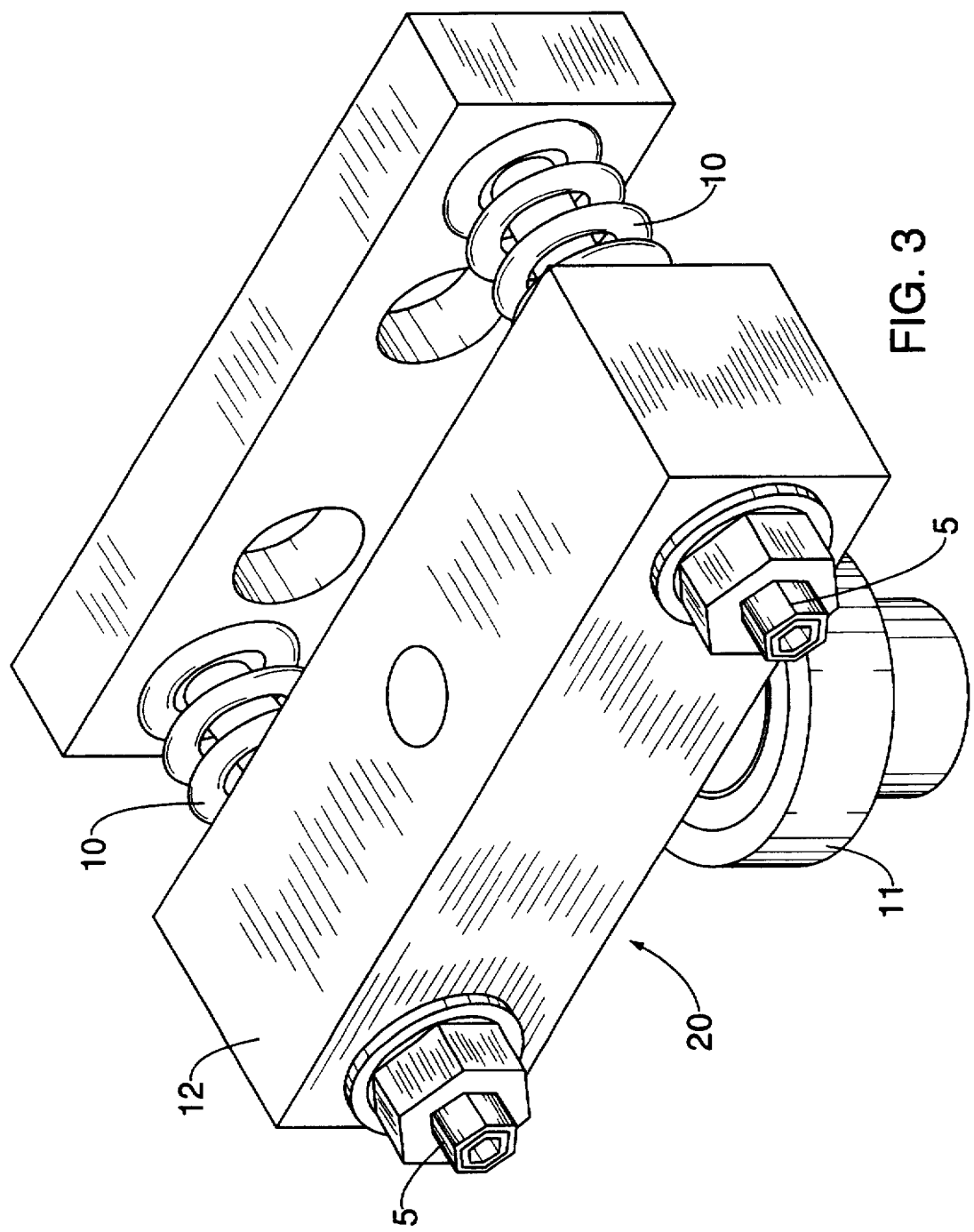
FIG. 3 is a detailed view of a bearing element in accordance with the present invention.

As shown in FIG. 1, tank 1 contains working liquid L which is a suitable dielectric, petroleum, etc. Tank 1 can move directly or indirectly, at least along axes OX, OY as shown, during machining operations.

In order to make possible the movement of tank 1 in relation to electrode-holder arm b, window 2 is machined in rear wall 3 of tank 1. In order to prevent liquid L in tank 1 from immediate escape through window 2 watertightness block 4 is used to prevent the discharge of liquid L through window 2.

Hole 5 through plate 7 allows electrode-holder arm b to enter tank 1.

Electrode-holder arm b can contain tubes, cables, etc. inside of arm b. Electrode-holder arm b is preferably stationary while tank 1 moves during the machining operation.

Heretofore, the idea was to maintain an absolute watertight seal between the plate and the electrode-holder arm and to maintain an absolute watertight seal between the plate and the wall of the tank. The need for an absolute watertight seal required strong forces, which entailed a transmission of stresses between the elements moving in relation to each other i.e. tank and arm. Additionally, in order to create the absolute watertight seal a complex arrangement was necessary.

The present invention is predicated on the opposite principle; i.e. that an absolute watertight seal is not necessary and that in order to minimize stress, an absolute watertight seal is avoid thereby minimizing the transmission of stresses between the tank and the arm. Additionally, it has been found that the solution provided by the present invention provides for a much simpler design.

The present invention employs semi-watertight coupling 6 between watertightness block 4 and electrode-holder arm b. The use of semi-watertight coupling 6 prevents intense friction between watertightness block 4 and electrode-holder arm b. It also prevents the gushing out of liquid L from tank 1. In this way watertightness block 4 has been converted into a semi-watertightness block.

The semi-watertightness block 4 contains, as its principal element, plate 7 which is preferably made of a plastic material having a low coefficient of friction, for example, the product of synthetic resinous fluorine sold under the trademark TEFLON.

Frame 8 made from a material similar to that of plate 7 is placed around window 2, on the surface of wall 3 of tank 1 so that a low friction exists between wall 3 and plate 7 and so that liquid L does not gush out of tank 1.

A series of tightening devices 9 are arranged to hold sheet 7 against frame 8. Each tightening device 9 has an adjustable tightening spring 10 which exerts a force on bearing 11 projecting from bushing 12 and against sheet 7. In this way, the transmission of stresses to arm b by movement of tank 1 is minimized, since the friction between sheet 7 is minimal. Bearing 11 can rotate to allow sheet 7 to move with minimal friction. Since the seal formed in the present invention is only semi-watertight, some liquid L escapes from tank 1. The liquid discharged through the semi-watertight coupling 6, sheet 7 and frame 8 is collected by pipe c and is returned to tank 1.

Plate 7 has only one frictional contact, the contact between plate 7 and frame 8. Because bearing 11 rotates, there is essentially no friction between plate 7 and bearing 11. Also, because of spring 10 and regulating nuts s the frictional contact between plate 7 and frame 8 can be regulated. The use of spring 10 and regulator nut s provides control of the frictional contact and the amount of liquid L that leaks out of tank 1.

As can be appreciated, the arrangement of the present invention provides a simple design which allows for easy access to plate 7 and the bearing arrangement. Thus cleaning, repairing and maintenance are simplified compared to the arrangements of the prior art.

It will be understood that the claims are intended to cover all changes and modifications of the preferred embodiments of the invention herein chosen for the purposes of illustration which do not constitute a departure from the spirit and scope of the invention.

I claim:

1. In an electroerosion machine having a tank (1) with a window (2) in a rear wall (3) of said tank, said window being covered by a sliding plate (7) in which a hole (5) has been machined, said hole providing passage for an electrode-holder arm (b) into said tank, the improvement comprising:

a) a semi-watertight block (4) that comprises:
      a1) a semi-watertight coupling (6) in peripheral contact with said arm (b) for making a semi-watertight watertight contact between said arm (b) and said block (4), and
      a2) said sliding plate (7) which is longer and wider than the dimensions of said window (2) of said rear wall (3) of said tank, said sliding plate being made of plastic of low coefficient of friction,
   b) a plastic frame (8) of low coefficient of friction placed around said window and fastened to said rear wall of said tank;
   c) a series of tightening elements (9, 10, 11) for holding said plate (7) in a semi-watertight arrangement against said plastic frame (8), said tightening elements being affixed to said rear wall (3) and positioned above and below said window, each said tightening element comprising a bearing (11) which presses against said plate (7) and rotates upon movement of said plate (7) each of said tightening elements being adjustable so as to vary pressure against said plate (7) and control said semi-watertight arrangement between said plate (7) and said frame (8), thereby providing a semi-watertight arrangement between said rear wall (3) and arm (b).

2. In an electroerosion machine having a tank, a window cut into the side wall of said tank for an electrode-holder arm to pass through said side wall of said tank and a plate for covering said window, the improvement comprising:

a) said plate slidably mounted against said side wall of said tank and positioned on a side of said side wall that faces outside of said tank, said plate having a width and a length greater than said window;
   b) a frame positioned between said side wall of said tank and said plate, said frame surrounding said window; and providing a semi-watertight seal between said plate and said wall;
   c) a series of tightening elements permanently affixed against said side wall and positioned above and below said window and holding said plate in a semi-watertight arrangement against said frame, each said tightening elements comprising a bearing which presses against said plate and rotates upon movement of said plate, each of said tightening elements having a spring which is adjustable and which presses said bearing away from said plate;
   d) said plate having a hole through which said electrode-holder arm passes; and
   e) a frame around said hole and in a semi-watertight arrangement between said plate and said electrode-holder arm thereby providing a semi-watertight arrangement between said rear wall (3) and arm (b).

* * * * *

UNITED STATES PATENT AND TRADEMARK OFFICE
CERTIFICATE OF CORRECTION

PATENT NO.   : 5,780,801
DATED        : July 14, 1998
INVENTOR(S)  : Javier Maidagan It is certified that error appears in the above-indentified patent and that said Letters Patent is hereby corrected as shown below:

Column 3, line 50 (claim 1), delete "watertight".

Signed and Sealed this

Twenty-second Day of September, 1998

Attest:

BRUCE LEHMAN

*Attesting Officer*           *Commissioner of Patents and Trademarks*